United States Patent
Zhu

(10) Patent No.: US 12,114,012 B2
(45) Date of Patent: Oct. 8, 2024

(54) POINT CLOUD DATA ENCODING METHOD, POINT CLOUD DATA DECODING METHOD, POINT CLOUD DATA PROCESSING METHOD, APPARATUSES, ELECTRONIC DEVICE, COMPUTER PROGRAM PRODUCT, AND COMPUTER-READABLE STORAGE MEDIUM

(71) Applicant: TENCENT TECHNOLOGY (SHENZHEN) COMPANY LIMITED, Guangdong (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 112 days.

(21) Appl. No.: 17/980,339

(22) Filed: Nov. 3, 2022

(65) Prior Publication Data

US 2023/0055026 A1    Feb. 23, 2023

Related U.S. Application Data

(63) Continuation of application No. PCT/CN2021/131291, filed on Nov. 17, 2021.

(30) Foreign Application Priority Data

Dec. 7, 2020 (CN) .......................... 202011440803.0

(51) Int. Cl.
*H04N 19/597* (2014.01)
*H04N 13/161* (2018.01)
(Continued)

(52) U.S. Cl.
CPC .................. *H04N 19/597* (2014.11)

(58) Field of Classification Search
CPC ................. G06T 9/001; H04N 19/13
See application file for complete search history.

(56) References Cited

U.S. PATENT DOCUMENTS

2018/0053324 A1* 2/2018 Cohen .................. G06T 9/001
2019/0116372 A1    4/2019 Cohen et al.
(Continued)

FOREIGN PATENT DOCUMENTS

CN        108632621 A    10/2018
CN        111405281 A     7/2020
(Continued)

OTHER PUBLICATIONS

International Search Report for PCT/CN2021/131291 dated Jan. 28, 2022 [PCT/ISA/210].
(Continued)

*Primary Examiner* — Getente A Yimer
(74) *Attorney, Agent, or Firm* — Sughrue Mion, PLLC

(57) ABSTRACT

A point cloud data encoding method is provided, which includes: acquiring initial point cloud data in a point cloud data processing environment; determining a space grid structure corresponding to the initial point cloud data; determining a filling order of different point cloud points in the initial point cloud data in the space grid structure; determining, based on the filling order of different point cloud points in the initial point cloud data in the space grid structure, residual information matched with the initial point cloud data; and encoding, according to the residual information, the initial point cloud data to obtain target point cloud data. A point cloud data decoding method, a point cloud data processing method, apparatuses, an electronic device, a computer program product, and a computer-readable storage medium are also provided.

14 Claims, 8 Drawing Sheets

(51) Int. Cl.
  *H04N 19/119*  (2014.01)
  *H04N 19/129*  (2014.01)
  *H04N 21/2343*  (2011.01)
  *H04N 21/4402*  (2011.01)
  *H04N 21/647*  (2011.01)

(56) References Cited

U.S. PATENT DOCUMENTS

2019/0311502 A1* 10/2019 Mammou ............... G06T 17/00
2020/0021856 A1*  1/2020 Tourapis ................ H04N 19/13
2020/0111236 A1*  4/2020 Tourapis ................ G06T 9/001
2020/0366932 A1  11/2020 Li et al.
2021/0092417 A1*  3/2021 Sugio .................... H04N 19/70
2021/0218947 A1*  7/2021 Oh ................... H04N 21/85406

FOREIGN PATENT DOCUMENTS

CN      111699683 A    9/2020
CN      111953998 A    11/2020
WO     2020/146539 A1   7/2020

OTHER PUBLICATIONS

Written Opinion for PCT/CN2021/131291 dated Jan. 28, 2022 [PCT/ISA/237].

* cited by examiner

POINT CLOUD DATA ENCODING METHOD, POINT CLOUD DATA DECODING METHOD, POINT CLOUD DATA PROCESSING METHOD, APPARATUSES, ELECTRONIC DEVICE, COMPUTER PROGRAM PRODUCT, AND COMPUTER-READABLE STORAGE MEDIUM

CROSS-REFERENCE TO RELATED APPLICATION(S)

This application is a continuation application of International Application No. PCT/CN2021/131291, filed Nov. 17, 2021, which claims priority to Chinese Patent Application No. 202011440803.0, filed on Dec. 7, 2020, the disclosures of which are herein incorporated by reference in their entireties.

FIELD

The disclosure relates to the technical field of point cloud data encoding, and in particular, to a point cloud data encoding method, a point cloud data decoding method, a point cloud data processing method, apparatuses, an electronic device, a computer program product, and a computer-readable storage medium.

BACKGROUND

Point cloud data is a representation form of a three-dimensional object or scene, and is composed of a group of discrete point sets randomly distributed in space. A discrete point set is used for expressing the spatial structure and surface attributes of a three-dimensional object or scene. There are millions of point cloud points in each frame of point cloud data, and each point cloud point contains geometrical information and attribute information such as color and reflectivity, so the data volume is relatively large. In order to accurately reflect information in space, a large number of discrete points are needed. In order to reduce the bandwidth occupied by point cloud data storage and transmission, it is necessary to encode and compress point cloud data. However, due to the dispersed position distribution of sparse point cloud data, the performance of point cloud data encoding is affected, and long encoding waiting time is cost, which leads to the low efficiency of point cloud data encoding in the related technology. As a result, users may perceive transmission latency caused by the low encoding efficiency, which is not beneficial to the user experience.

SUMMARY

Technical solutions of embodiments of the disclosure are implemented as follows:

An aspect of an example embodiment of the disclosure provides a point cloud data encoding method, which includes:
  acquiring initial point cloud data in a point cloud data processing environment;
  determining a space grid structure corresponding to the initial point cloud data;
  determining a filling order of different point cloud points in the initial point cloud data in the space grid structure;
  determining, based on the filling order of different point cloud points in the initial point cloud data in the space grid structure, residual information matched with the initial point cloud data; and
  encoding, according to the residual information, the initial point cloud data to obtain target point cloud data.

An aspect of an example embodiment of the disclosure provides a point cloud data decoding method, which includes:
  acquiring a point cloud data bitstream to be decoded;
  determining starting position information corresponding to a space-filling curve that corresponds to the point cloud data bitstream to be decoded;
  determining residual information corresponding to the point cloud data bitstream to be decoded; and
  reconstructing, based on the starting position information corresponding to the space-filling curve and the residual information, the point cloud data bitstream to be decoded so as to acquire initial point cloud data in a point cloud data processing environment by decoding.

An aspect of an example embodiment of the disclosure provides a point cloud data processing method, which includes:
  acquiring initial point cloud data in a point cloud data processing environment;
  determining a space grid structure corresponding to the initial point cloud data;
  determining a filling order of different point cloud points in the initial point cloud data in the space grid structure;
  determining, based on the filling order of different point cloud points in the initial point cloud data in the space grid structure, residual information matched with the initial point cloud data;
  encoding, according to the residual information, the initial point cloud data to obtain target point cloud data;
  acquiring a point cloud data bitstream to be decoded;
  determining starting position information corresponding to a space-filling curve that corresponds to the point cloud data bitstream to be decoded;
  determining residual information corresponding to the point cloud data bitstream to be decoded; and
  reconstructing, based on the starting position information corresponding to the space-filling curve and the residual information, the point cloud data bitstream to be decoded so as to acquire initial point cloud data in a point cloud data processing environment by decoding.

An aspect of an example embodiment of the disclosure provides a point cloud data encoding apparatus, which includes at least one memory configured to store program code; and at least one processor configured to read the program code and operate as instructed by the program code, the program code including:
  first information transmission code configured to cause the at least one processor to acquire initial point cloud data in a point cloud data processing environment; and
  encoding code configured to cause the at least one processor to determine a space grid structure corresponding to the initial point cloud data;
  determine a filling starting point in the space grid structure and a filling order of different point cloud points in the initial point cloud data in the space grid structure;
  determine residual information matched with the initial point cloud data based on the filling order of different point cloud points in the initial point cloud data in the space grid structure; and
  encode, according to the residual information, the initial point cloud data to acquire target point cloud data.

An aspect of an example embodiment of the disclosure provides a point cloud data processing apparatus, which includes at least one memory configured to store program code; and at least one processor configured to read the program code and operate as instructed by the program code, the program code including:

third information transmission code configured to cause the at least one processor to acquire initial point cloud data in a point cloud data processing environment;

encoding code configured to cause the at least one processor to determine a space grid structure corresponding to the initial point cloud data;

determine a filling order of different point cloud points in the initial point cloud data in the space grid structure;

determine residual information matched with the initial point cloud data based on the filling order of different point cloud points in the initial point cloud data in the space grid structure; and encode, according to the residual information, the initial point cloud data to acquire target point cloud data;

fourth information transmission code configured to cause the at least one processor to acquire a point cloud data bitstream to be decoded; and decoding code configured to cause the at least one processor to determine starting position information corresponding to a space-filling curve that corresponds to the point cloud data bitstream to be decoded;

determine residual information corresponding to the point cloud data bitstream to be decoded; and reconstruct, based on the starting position information corresponding to the space-filling curve and the residual information, the point cloud data bitstream to be decoded so as to acquire initial point cloud data in a point cloud data processing environment by decoding.

An aspect of an example embodiment of the disclosure provides an electronic device, which includes:

a memory, configured to store executable instructions; and a processor, configured to, when runs the executable instructions stored in the memory, implement the point cloud data encoding method according to the embodiments of the disclosure, or, implement the point cloud data decoding method according to the embodiments of the disclosure, or, implement the point cloud data processing method according to the embodiments of the disclosure.

An aspect of an example embodiment of the disclosure provides a non-transitory computer-readable storage medium storing executable instructions that, when executed by a processor, implement the point cloud data encoding method according to the embodiments of the disclosure, or, implement the point cloud data decoding method according to the embodiments of the disclosure, or, implement the point cloud data processing method according to the embodiments of the disclosure.

DETAILED DESCRIPTION

Figure 1:
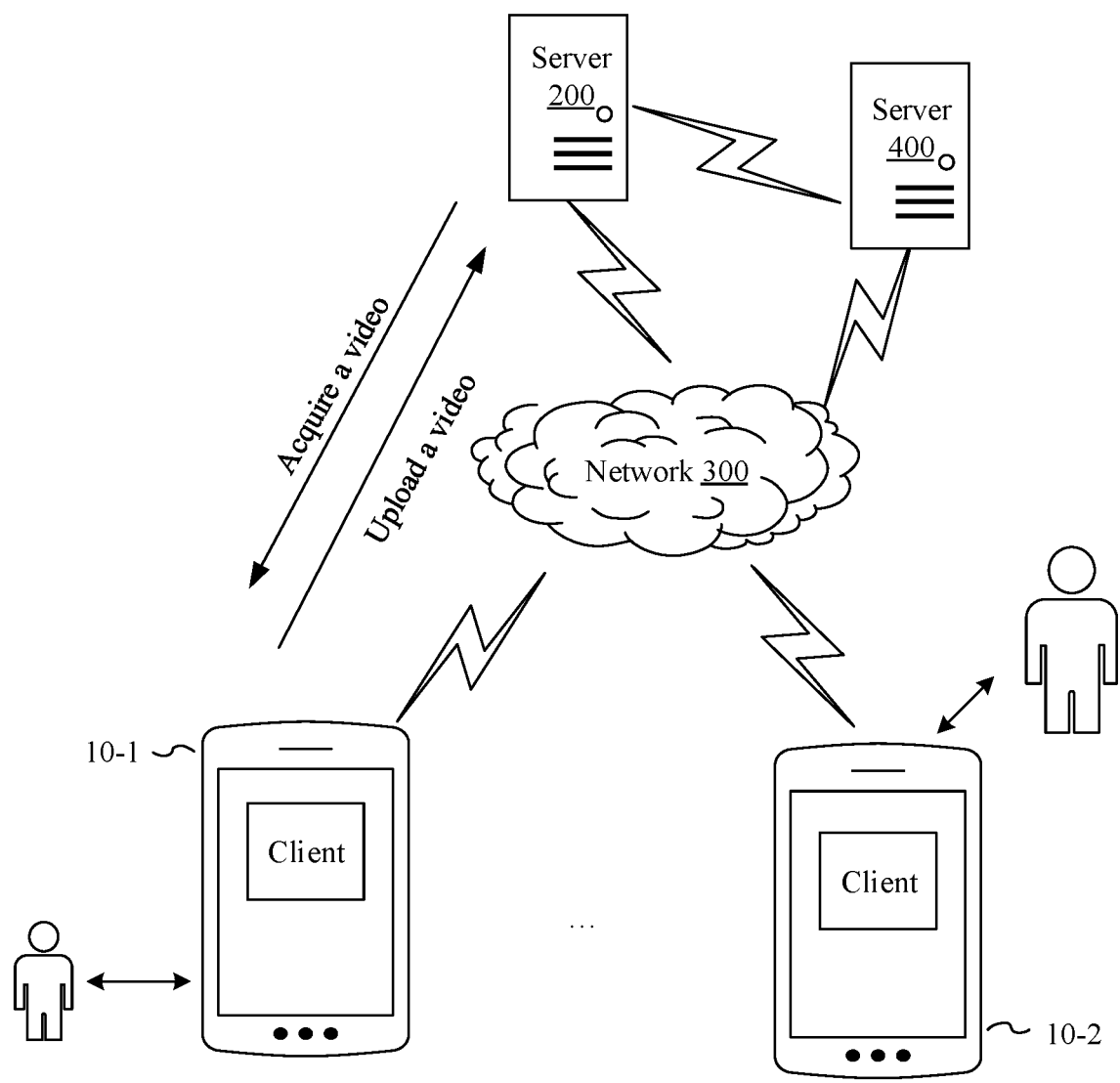
FIG. 1 is a schematic diagram of a usage scenario of a point cloud data processing method according to an embodiment of the disclosure.

To make the objectives, technical solutions, and advantages of the disclosure clearer, the following describes the disclosure in further detail with reference to the accompanying drawings. The described embodiments are not to be considered as a limitation to the disclosure. All other embodiments obtained by a person of ordinary skill in the art without creative efforts shall fall within the protection scope of the disclosure.

In the following descriptions, the term "some embodiments" describes a subset of all possible embodiments. However, it may be understood that the "some embodiments" may be the same subset or different subsets of all the possible embodiments, and may be combined with each other without conflict.

Before the embodiments of the disclosure are further described in detail, a description is made on nouns and terms in the embodiments of the disclosure, and the nouns and terms in the embodiments of the disclosure are applicable to the following explanations.

1) API: the full name is application programming interface. APIs are predefined functions or refer to conventions for the connection of different components of a software system. The objective is to provide an application program and a developer the ability to access a set of routines based on certain software or hardware without accessing source codes or understanding details of an internal working mechanism.

2) SDK: the full name is software development kit. SDK usually refers to a set of development kits for building application software for specific software packages, software frameworks, hardware platforms, operating systems, and the like. In a broad sense, it includes a set of relevant documents, examples and kits that assist in the development of a certain type of software.

3) Point cloud compression (PCC): a point cloud is a group of discrete point sets randomly distributed in space that express the spatial structure and surface attributes of a three-dimensional object or scene. The spatial structure and surface attributes of a three-dimensional object or scene may be flexibly and conveniently expressed through three-dimensional position information and other information such as color and material that are recorded in a large number of points.

4) Geometry-based point cloud compression (G-PCC)

5) Bounding box is an algorithm for solving an optimal bounding space of a set of discrete points. The basic idea is to use a geometric solid (referred to as a bounding box) with slightly large volume and simple features to approximately replace a complex geometric object.

6) Video encoding and decoding standards: A certain agreed-upon video bitstream encoding rule.

7) Video transcoding refers to a conversion of a video stream on which compression coding has been performed to another video stream, to adapt to different network bandwidths, different terminal processing capabilities, and different user requirements.

8) Client: a carrier that implements specific functions in a terminal. For example, a mobile client (APP) is a carrier with specific functions, such as the function of performing online live broadcast (video streaming) and the function of playing online videos, in a mobile terminal.

9) In response to: is used for representing a condition or a status on which a performed operation depend. When the condition or status is satisfied, the one or more performed operations may be real-time or may have a set delay. Unless explicitly stated, there is no chronological order between the plurality of performed operations.

10) Mini program: programs developed based on front-end-oriented languages (e.g. JavaScript) and implementing services in a hypertext markup language (HTML) page, software downloaded by a client (e.g. a browser or any client embedded in the core of the browser) through a network (e.g. the Internet) and interpreted and executed in a browser environment of the client, which saves installation steps in the client. For example, a mini program in a terminal that may be woken up by a voice command may be a mini program that may be downloaded by and run on a client in a social network to implement various services such as image editing and human eye image correction.

A usage environment of a point cloud data encoding method according to the embodiments of the disclosure will be described below by taking a video as an example. FIG. 1 is a schematic diagram of a usage scenario of a point cloud data processing method according to an embodiment of the disclosure. Referring to FIG. 1, corresponding clients capable of implementing different functions are arranged in terminals (including a terminal 10-1 and a terminal 10-2), and the clients in the terminals (including the terminal 10-1 and the terminal 10-2) use different service processes to acquire different video information for browsing from a corresponding server 200 through a network 300. The video information may be transmitted in the form of point cloud data, the terminals are connected to the server 200 through the network 300, and the network 300 may be a wide area network or a local area network, or a combination thereof, and uses wireless links to transmit data.

For example, types of point cloud data transmitted between the terminals (including the terminal 10-1 and the terminal 10-2) and the corresponding server 200 through the network 300 are different. For example, a video transmitted between the terminals (including the terminal 10-1 and the terminal 10-2) and the corresponding server 200 through the network 300 may be sparse point cloud data (or the video carries video information or a video link of corresponding sparse point cloud data), or a real-time video including only intensive point cloud data is transmitted between the terminals and a corresponding server 400 through the network 300 (e.g. point cloud data of a live video or vehicle driving video data acquired by a vehicle terminal may represent various objects or obstacles in the video, and the obstacles may be, for example, people, vehicles, and animals) Different types of point cloud data may be stored in the server 200 and the server 400.

In some embodiments, processes of different types of videos stored in the server 200 may be written in software codes of different programming languages, and code objects may be different types of code entities. For example, in software codes of the C language, a code object may be a function. In software codes of the JAVA language, a code object may be a class, and in the OC language of an IOS terminal, a code object may be a piece of target code. In software codes of the C++ language, a code object may be a class or a function. In the disclosure, no distinction is made between compilation environments of different types of videos. However, there are millions of point cloud points in each frame of point cloud data, and each point contains geometrical information and attribute information such as color and reflectivity, so the data volume is relatively large. In order to accurately reflect information in space, a large number of discrete points are needed. In order to reduce the bandwidth occupied by point cloud data storage and transmission, it is necessary to encode and compress point cloud data. However, due to the dispersed position distribution of sparse point cloud data, the encoding efficiency is relatively low, which affects the performance of point cloud data encoding, costs long encoding waiting time, and is not beneficial to the user experience.

In some embodiments, during transmitting or receiving different types of point cloud data by the server 200 through the network 300 to/from the terminals (including the terminal 10-1 and/or the terminal 10-2), because video information occupies relatively large storage space and transmission bandwidth, it is necessary to encode and compress point cloud data. For example, the server 200 is configured to acquire initial point cloud data in a point cloud data processing environment; determine a space grid structure corresponding to the initial point cloud data; determine a filling starting point in the space grid structure and a filling order of different point cloud points in the initial point cloud data in the space grid structure; determine, based on the filling order of different point cloud points in the initial point cloud data in the space grid structure, residual information matched with the initial point cloud data; and encode, according to the residual information, the initial point cloud data to obtain target point cloud data.

In some embodiments, in a case that the point cloud data decoding method of the disclosure is applied to the terminal 10-1 and/or the terminal 10-2, the terminal 10-1 and/or the terminal 10-2 acquire a point cloud data bitstream to be decoded; determine starting position information corresponding to a space-filling curve that corresponds to the point cloud data bitstream to be decoded; determine residual information corresponding to the point cloud data bitstream to be decoded; and reconstruct, based on the starting position information corresponding to the space-filling curve and the residual information, the point cloud data bitstream to be decoded so as to acquire initial point cloud data in a point cloud data processing environment by decoding.

Figure 2:
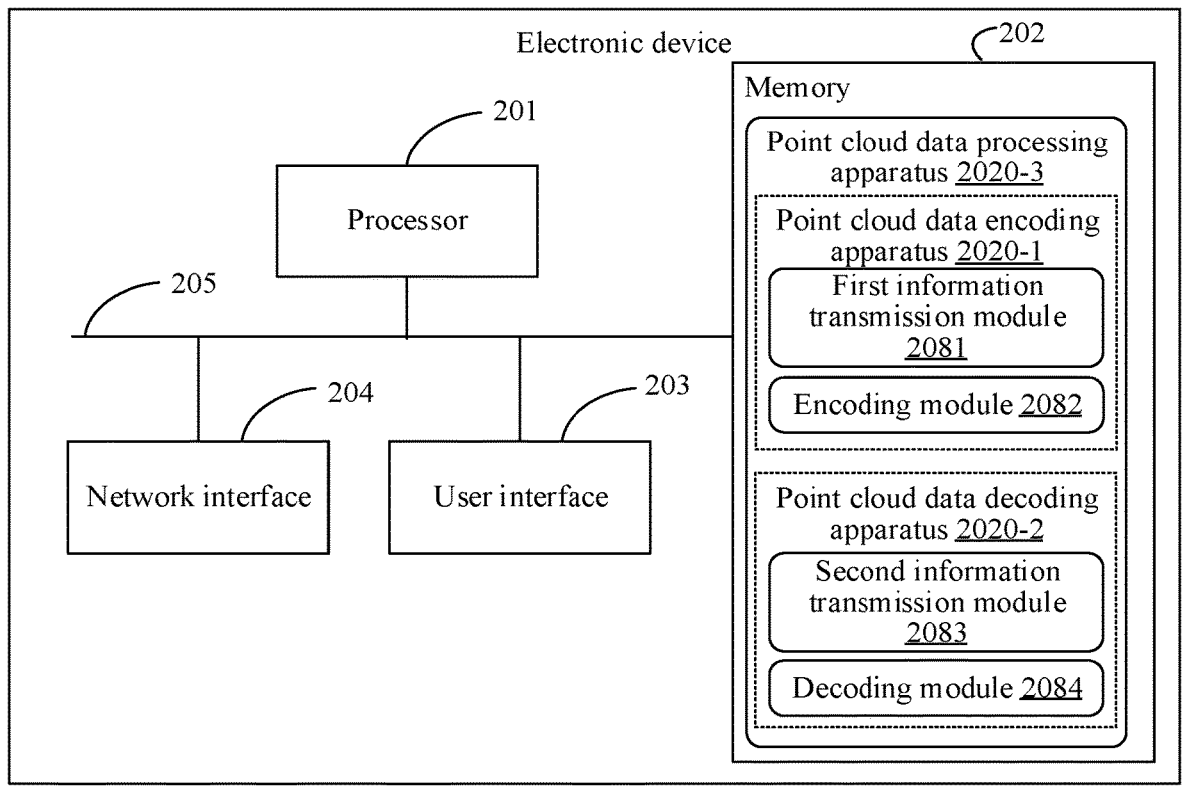
FIG. 2 is a schematic structural diagram of an electronic device according to an embodiment of the disclosure.

A structure of an electronic device according to the embodiments of the disclosure will be described in detail below. The electronic device may be implemented in a variety of forms. For example, the electronic device may be a dedicated terminal with the point cloud data processing function such as a gateway, or may be a server with the point cloud data processing function such as the server 200 in FIG. 1. FIG. 2 is a schematic structural diagram of an electronic device according to an embodiment of the disclosure. It may be understood that, FIG. 2 shows only an exemplary structure rather than a complete structure of a server. The structure shown in FIG. 2 may be partially or entirely implemented based on requirements of an embodiment.

The electronic device provided in the embodiments of the disclosure includes: at least one processor 201, a memory 202, a user interface 203, and at least one network interface 204. The components in the electronic device are coupled by using a bus system 205. It may be understood that the bus system 205 is configured to implement connection and communication between the components. In addition to a data bus, the bus system 205 further includes a power bus, a control bus, and a status signal bus. However, for ease of clear description, all types of buses in FIG. 2 are marked as the bus system 205.

The user interface 203 may include a display, a keyboard, a mouse, a trackball, a click wheel, a key, a button, a touchpad, a touch screen, or the like.

It may be understood that the memory 202 may be a volatile memory or a non-volatile memory, or may include both a volatile memory and a non-volatile memory. The memory 202 in the embodiments of the disclosure may store data to support an operation of the terminal (such as, 10-1). Examples of the data include: any computer program operated on the terminal (such as, 10-1), such as, an operating system and an application program The operating system includes various system programs, such as, a frame layer, a core library layer, and a driver layer, used for implementing various basic services and processing tasks based on hardware. The application program may include various application programs.

In some embodiments, a point cloud data encoding apparatus provided in the embodiments of the disclosure may be implemented in the form of a combination of software and hardware. As an example, the point cloud data encoding apparatus provided in the embodiments of the disclosure may be a processor in the form of a hardware decoding processor, and is programmed to execute the point cloud data encoding method provided in the embodiments of the disclosure. For example, the processor in the form of a hardware decoding processor may use one or more application specific integrated circuits (ASIC), a DSP, a programmable logic device (PLD), a complex PLD (CPLD), a field-programmable gate array (FPGA), or another electronic element.

In an example in which the point cloud data encoding apparatus provided in the embodiments of the disclosure is implemented by a combination of software and hardware, the point cloud data encoding apparatus provided in the embodiments of the disclosure may be directly embodied as a combination of software modules executed by the processor 201. The software modules may be located in a storage medium, and the storage medium is located in the memory 202. The processor 201 reads executable instructions included in the software modules in the memory 202 and implements, in combination with related hardware (for example, including the processor 201 and other components connected to the bus 205), the point cloud data encoding method provided in the embodiments of the disclosure.

As an example, the processor 201 may be an integrated circuit chip, and has a signal processing capability, such as, a general purpose processor, a digital signal processor (DSP), or another programmable logical device, a discrete gate or a transistor logical device, or a discrete hardware component. The general purpose processor may be a microprocessor, a processor of any known type, or the like.

In an example in which the point cloud data encoding apparatus provided in the embodiments of the disclosure is implemented by hardware, the apparatus provided in the embodiments of the disclosure may be directly executed by using the processor 201 in the form of a hardware decoding processor, such as, one or more ASICs, DSPs, PLDs, CPLDs, FPGAs, or other electronic elements, to execute the point cloud data encoding method provided in the embodiments of the disclosure.

The memory 202 in the embodiments of the disclosure is configured to store various types of data to support an operation of the electronic device. Examples of the data include: any executable instruction configured to be operated on the electronic device, such as an executable instruction, and a program that implements the point cloud data encoding method in the embodiments of the disclosure may be included in the executable instruction.

In other some embodiments, the point cloud data encoding apparatus according to the embodiments of the disclosure may be implemented in the form of software. FIG. 2 show a point cloud data processing apparatus 2020-3 stored in the memory 202, which may be software in the form of programs and plug-in and include a series of modules.

In some embodiments, the point cloud data processing apparatus 2020-3 includes: a point cloud data encoding apparatus 2020-1 and a point cloud data decoding apparatus 2020-2. The software modules in the point cloud data processing apparatus 2020-3, when read by the processor 201 into an RAM and executed, implement the point cloud data processing method according to the embodiments of the disclosure. In some embodiments, the point cloud data encoding apparatus 2020-1 includes the following software modules: a first information transmission module 2081 and an encoding module 2082. The software modules in the point cloud data encoding apparatus 2020-1, when read by the processor 201 into an RAM and executed, implement the point cloud data encoding method according to the embodiments of the disclosure.

In some embodiments, the point cloud data decoding apparatus 2020-2 includes the following software modules: a second information transmission module 2083 and a decoding module 2084. The software modules in the point cloud data decoding apparatus 2020-2, when read by the processor 201 into an RAM and executed, implement the point cloud data decoding method according to the embodiments of the disclosure.

According to the electronic device in FIG. 2, in an aspect of the disclosure, the disclosure further provides a computer program product or a computer program. The computer program product or the computer program includes computer instructions, and the computer instructions are stored in a computer-readable storage medium. A processor of the computer device reads the computer instructions from the computer-readable storage medium and executes the computer instructions to enable the computer device to implement different embodiments and combinations of the embodiments according to various implementation modes of the above point cloud data encoding method, or, different embodiments and combinations of the embodiments according to various implementation modes of the point cloud data decoding method, or, different embodiments and combinations of the embodiments according to various implementation modes of the point cloud data processing method.

Figure 3:
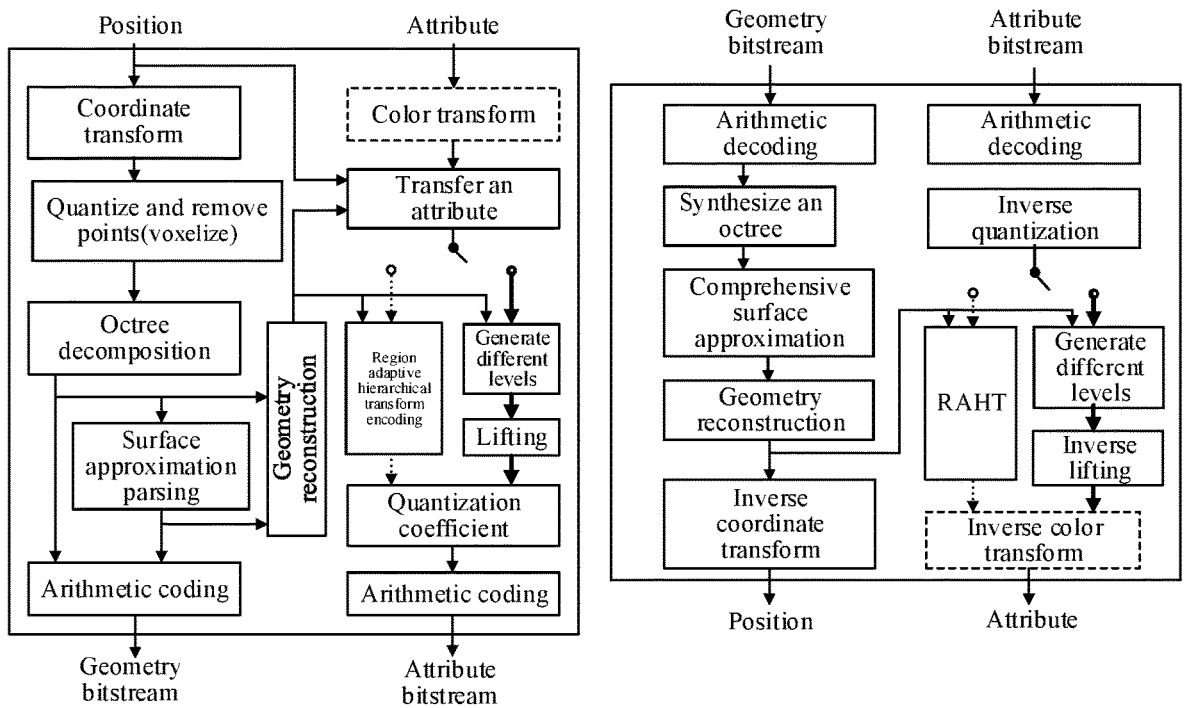
FIG. 3 is a schematic flowchart of a point cloud data encoding process according to an embodiment of the disclosure.

Before the point cloud data encoding method of the disclosure is described, a point cloud data encoding process in the related technology is first described. FIG. 3 is a schematic flowchart of a point cloud data encoding process according to an embodiment of the disclosure. The point cloud data encoding process shown in FIG. 3 mainly includes the following steps: 1) pre-processing is performed on point cloud data. The pre-processing includes: coordinate transform and voxelization. Point cloud data in 3D space is converted into the form of integers by zooming and translation, and the minimum geometric position of the point cloud data is moved to the origin of the coordinate system. 2) Geometry encoding is performed. Two geometry encoding modes are available for different conditions. One is octree-based geometry encoding, which specifically includes: the pre-processed point cloud data is divided based on an octree. An octree is a tree data structure. During division of 3D space, a preset bounding box may be equally divided, and each node has eight child nodes. By indicating whether each child node in the octree is occupied with '1' and '0', occupancy code information is acquired and used as a point cloud geometrical information bitstream. The other one is trisoup, which specifically includes: a point cloud may be divided into blocks of a certain size, intersection points of the surface of the point cloud at edges of the blocks are located, and triangles are constructed. Compression of geometrical information is realized by encoding positions of intersection points. 3) Geometry quantization is performed. The fineness of quantization may be determined by quantization parameters (QPs). Large values of QPs indicate that coefficients in a large value range are quantized as one output, which will cause high distortion and low code rate. On the contrary, small values of QPs indicate that coefficients in a small value range are quantized as one output, which will cause low distortion and high code rate. During point cloud encoding, quantization is directly performed on coordinate information of points. 4) Geometry entropy encoding is performed. An octree structure is taken as an example, statistical compression and encoding may be performed on occupancy code information of an octree, and finally a binary (0 or 1) compressed bitstream is outputted. Statistical encoding is a lossless encoding mode, which may effectively reduce code rate required by expressing the same signal. A commonly used statistical encoding mode is content adaptive binary arithmetic coding (CABAC).

In the embodiments of the disclosure, an attribute information encoding process may include the following steps: 1) Recoloring is performed on attributes. Under the conditions of lossy encoding, after geometrical information is encoded, an encoding end may decode and reconstruct the geometrical information, that is, restore coordinate information of each point in a 3D point cloud. Attribute information corresponding to one or more adjacent points is searched in an original point cloud and used as attribute information of a reconstructed point. 2) Attribute transform encoding is performed. Three attribute transform encoding modes are available for different conditions. 1. Predicting transform encoding, which includes: A child point set is selected according to a distance, and point cloud data is divided into multiple different levels of detail (LoD) to realize a point cloud representation from coarse to fine. Bottom-up prediction may be performed on adjacent levels, that is, attribute information of a point introduced into a fine level is predicted based on an adjacent point in a coarse level to obtain a corresponding residual signal. Points in the lowest level are used as reference information and encoded. 2. Lifting transform encoding: On the basis of prediction of adjacent LoD, a weight update policy of a neighborhood point is introduced, finally a predicted attribute value of each point is obtained, and a corresponding residual signal is obtained. 3) Region-adaptive hierarchical transform (RAHT) encoding is performed. RAHT is performed on the attribute information to convert the signal to a transform domain, which is referred to as transform coefficients. 4) Attribute quantization is performed. The fineness of quantization may be determined by quantization parameters (QPs). During predicting transform encoding and lifting transform encoding, quantization and entropy encoding are performed on residual values. During RAHT, quantization and entropy encoding are performed on transform coefficients. 5) Attribute entropy coding: Finally, the quantized attribute residual signal or transform coefficients are generally compressed by run length coding and arithmetic coding. During corresponding encoding, information, such as quantization parameters, is also encoded by an entropy encoder.

In the point cloud data encoding process shown in FIG. 3, there are millions of point cloud points in each frame of point cloud data, and each point contains geometrical information and attribute information such as color and reflectivity, so the data volume is relatively large. In order to accurately reflect information in space, a large number of discrete points are needed. In order to reduce the bandwidth occupied by point cloud data storage and transmission, it is necessary to encode and compress point cloud data. However, due to the dispersed position distribution of sparse point cloud data, the encoding efficiency is relatively low, which affects the performance of point cloud data encoding, costs long encoding waiting time, increases the calculation amount of a hardware device, and is not beneficial to the user experience.

In order to overcome the above problems in the related art, the point cloud data encoding method according to the embodiments of the disclosure may encode, based on a filling order of different point cloud points in initial point cloud data in a space grid structure, the initial point cloud data to obtain target point cloud data, which reduces the complexity of point cloud data encoding, reduces the waiting time of point cloud data encoding, saves the calculation amount of point cloud data encoding, improves efficiency of point cloud data encoding, and improves the user experience.

Figure 4:
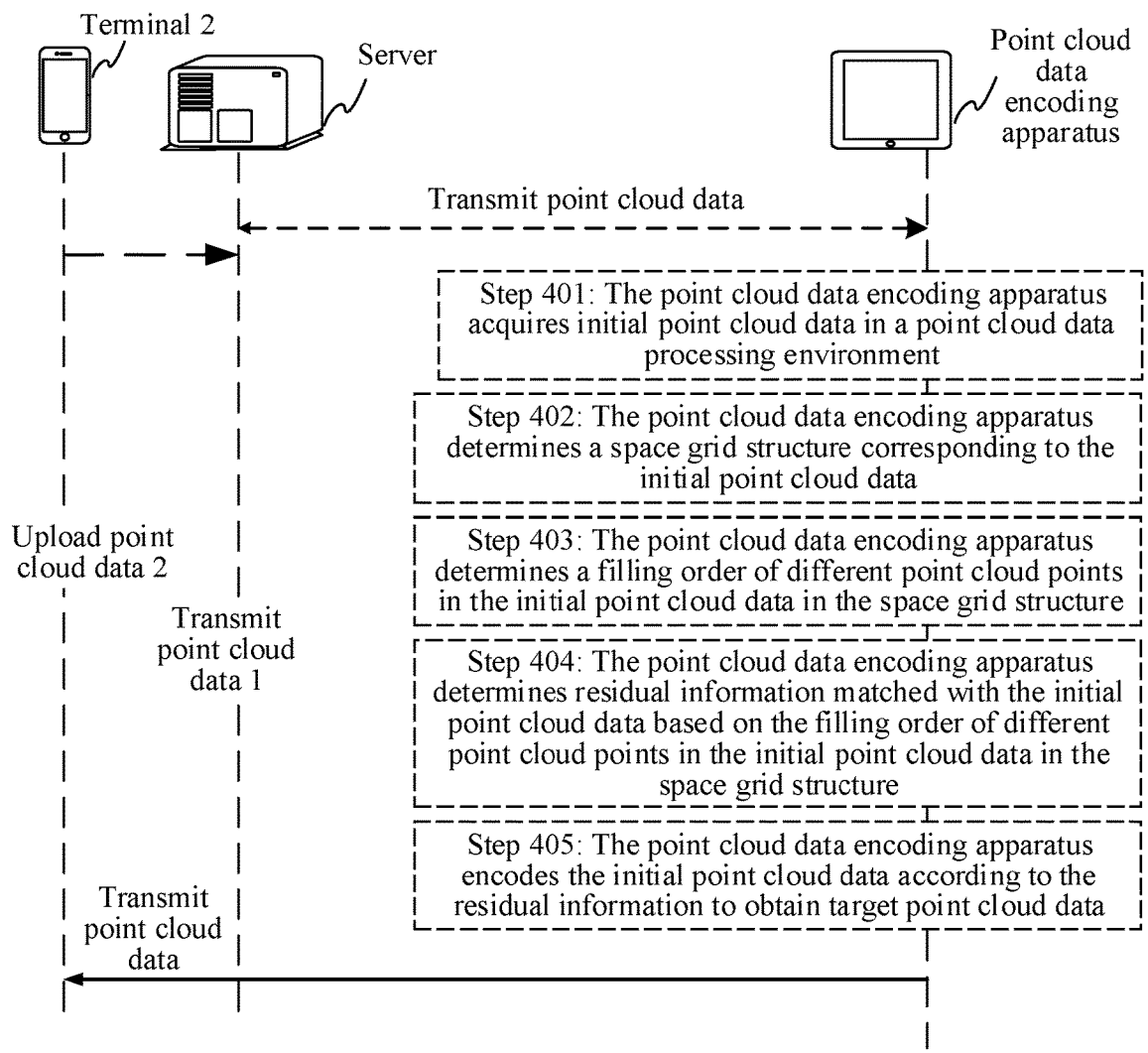
FIG. 4 is a schematic flowchart of a point cloud data encoding method according to an embodiment of the disclosure.

The point cloud data encoding method according to the embodiments of the disclosure will be described below with reference to the above embodiments. Referring to FIG. 4, which is a schematic flowchart of a point cloud data encoding method according to an embodiment of the disclosure, steps shown in FIG. 4 may be implemented by various servers on which a point cloud data processing apparatus runs, such as a dedicated terminal, server or server cluster with the point cloud data processing function. The following describes steps 401-405 as shown in FIG. 4.

Step 401. A point cloud data encoding apparatus acquires initial point cloud data in a point cloud data processing environment.

Point cloud data is widely applied to construction of city digital maps. For example, point cloud data plays a technical supporting role in many hot researches such as smart city, unmanned driving, and cultural relics protection. A point cloud is a set of point cloud points in 3D space that are acquired by sampling the surface of an object with a three-dimensional scanning device. Each point cloud point has related attributes such as color, material characteristics, texture information, strength attributes, reflectivity attributes, motion-related attributes, modal attributes, and other various attributes. A point cloud may be used for reconstructing an object or scene. Initial point cloud data may be acquired by using multiple cameras and depth sensors in various settings, and a point cloud is composed of thousands to billions of point cloud points, which is beneficial to true representation of a reconstructed scene. A point cloud data processing environment may be that, for example, a three-dimensional object in a vehicle autonomous driving environment is directly digitized by using a laser radar or camera matrix into data of a point. Each point includes its position information and other information such as color information. A point cloud corresponding to a static object in the autonomous driving environment contains tens of millions of point cloud data, and each frame of point cloud corresponding to a dynamic object may contain millions of point cloud data. There is no correlation and order between point cloud points in such a point cloud, so the point cloud points may be randomly sorted according to such characteristics to greatly compress images of an object appearing during road information acquisition in the autonomous driving environment.

Step 402. The point cloud encoding apparatus determines a space grid structure corresponding to the initial point cloud data.

In the embodiments of the disclosure, step 402 of determining a space grid structure corresponding to the initial point cloud data may be implemented by the following technical solutions: side length parameters of division child nodes or number parameters of the division child nodes are determined in a case that an equal division mode is adopted; and bounding box space corresponding to the initial point cloud data is divided based on the side length parameters of the division child nodes or the number parameters of the division child nodes to obtain a space grid structure corresponding to the initial point cloud data.

For example, the bounding box space corresponding to the initial point cloud data may be the largest bounding box space, and may be adjusted according to the point cloud data processing environment so as to be matched with the point cloud data processing environment. A bounding box is an algorithm for solving the optimal bounding space of discrete point sets, and may use geometric bodies (referred to as bounding boxes) with different volumes and simple characteristics to approximately replace complex geometric objects. The bounding box space used in the embodiments of the disclosure includes, but is not limited to: an axis-aligned bounding box (AABB), a bounding sphere, an oriented bounding box, and a fixed direction hull (FDH or k-DOP).

In the embodiments of the disclosure, step 402 of determining a space grid structure corresponding to the initial point cloud data may be implemented by the following technical solutions: depth parameters of an octree structure or the number of affiliate nodes of child nodes in the octree structure is determined in a case that the initial point cloud data is divided based on the octree structure; and bounding box space corresponding to the initial point cloud data is divided based on the depth parameters of the octree structure or the number of the affiliate nodes of the child nodes in the octree structure to obtain a space grid structure corresponding to the initial point cloud data.

Figure 5:
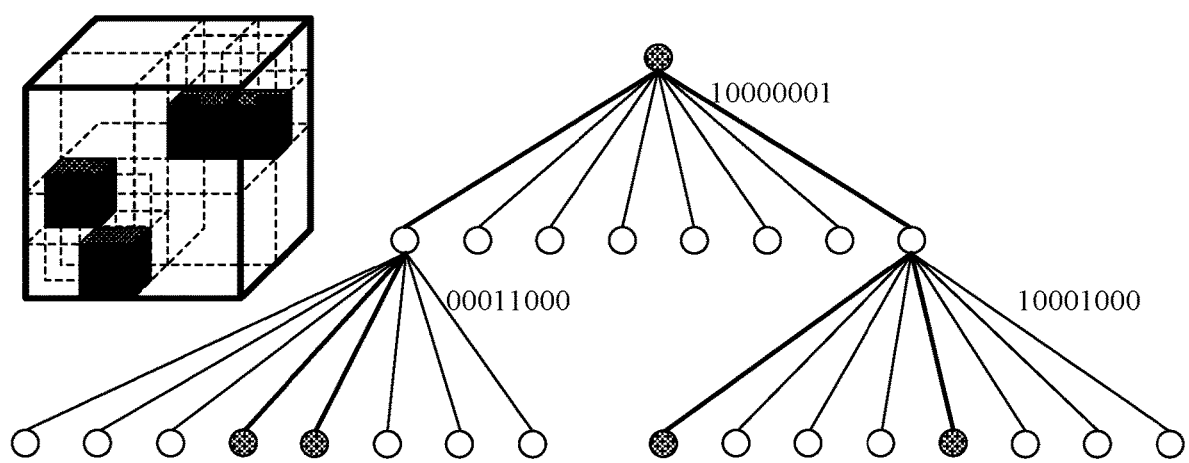
FIG. 5 is a schematic structural diagram of an octree according to an embodiment of the disclosure.

For example, referring to FIG. 5, which is a schematic structural diagram of an octree according to an embodiment of the disclosure, an octree is a tree data structure and used for processing point cloud data in 3D space. According to an octree-based division mode, a preset bounding box is equally divided level by level, and each node has eight child nodes. By indicating whether each child node in the octree nodes is occupied with '1' and '0', as shown in FIG. 5, occupancy code information is acquired and used as a point cloud geometrical information bitstream.

The octree is constructed based on the Morton order, and 3D coordinate information of the point cloud data may be converted into corresponding Morton codes by querying a Morton order table. Corresponding points in each layer of the octree are acquired according to a sorting result of the Morton codes. The point cloud encoding technology in the related technology uses the octree-based division to represent point cloud data, and performs different processing on geometrical information and attribute information.

In the embodiments of the disclosure, step 402 of determining a space grid structure corresponding to the initial point cloud data may be implemented by the following technical solutions:

an adaptive standard matched with the point cloud data processing environment is determined in a case that the initial point cloud data is divided based on the adaptive standard; and bounding box space corresponding to the initial point cloud data is divided based on the adaptive standard matched with the point cloud data processing environment to obtain a space grid structure corresponding to the initial point cloud data.

For example, the adaptive standard matched with the point cloud data processing environment may be set based on the density of point cloud points so as to realize density-based equal space division, or, may be set based on distribution positions of point cloud points so as to realize distribution position-based equal space division.

Step 403. The point cloud data encoding apparatus determines a filling order of different point cloud points in the initial point cloud data in the space grid structure.

In some embodiments, before the filling order of different point cloud points in the initial point cloud data in the space grid structure is determined, a filling starting point in the space grid structure is determined based on the origin of a space coordinate system corresponding to the space grid structure, or a filling starting point in the space grid structure is determined based on a coordinate point corresponding to the lower left corner coordinate of a starting bounding box corresponding to the initial point cloud data. The filling starting point is the first filling point corresponding to the filling order.

In the embodiments of the disclosure, step 403 of determining a filling order of different point cloud points in the initial point cloud data in the space grid structure may be implemented by the following technical solutions: the order of a space-filling curve is determined according to the number of division child nodes; a filling mode corresponding to the order is determined according to the order of the space-filling curve; and a filling order matched with the filling mode is determined.

For example, a filling starting point in the space grid structure is determined based on the origin of a space coordinate system corresponding to the space grid structure, or a filling starting point in the space grid structure is determined based on a coordinate point corresponding to the lower left corner coordinate of a starting bounding box corresponding to the initial point cloud data; and after the filling starting point in the space grid structure is determined, a corresponding filling mode is triggered, and a filling order, matched with the filling mode, of different point cloud points in the initial point cloud data in the space grid structure is determined.

In the embodiments of the disclosure, the operation of determining a filling order matched with the filling mode may be implemented by the following technical solutions:

positions, corresponding to different point cloud points in the initial point cloud data, in a single space-filling curve are determined in a case that the filling mode is processing with the single space-filling curve; and the positions, corresponding to different point cloud points in the initial point cloud data, in the single space-filling curve are connected in series, and a filling order, matched with the filling mode, of different point cloud points in the initial point cloud data in the space grid structure is determined.

For example, the order of a space-filling curve is determined according to the number of division child nodes. After the order of the space-filling curve is determined, a filling mode corresponding to the order is determined, and positions, corresponding to different point cloud points in the initial point cloud data, in a single space-filling curve are determined in a case that the filling mode is processing with the single space-filling curve. The positions, corresponding to different point cloud points in the initial point cloud data, in the single space-filling curve are connected in series, and a filling order, matched with the filling mode, of different point cloud points in the initial point cloud data in the space grid structure is determined.

In some embodiments, the operation of determining a filling order matched with the filling mode may be implemented by the following technical solutions: corresponding division child nodes are processed with at least two types of space-filling curves in a case that the filling mode is processing with the at least two types of space-filling curves, and positions, corresponding to different point cloud points in the initial point cloud data, in a corresponding space-filling curve are determined; and the positions, corresponding to different point cloud points in the initial point cloud data, in the corresponding space-filling curve are sorted, and a filling order, matched with the filling mode, of the different point cloud points in the initial point cloud data in the space grid structure are determined.

For example, after the order of a space-filling curve is determined, a filling mode corresponding to the order is determined, corresponding division child nodes are processed with at least two types of space-filling curves in a case the filling mode is processing with the at least two types of space-filling curves, and positions, corresponding to different point cloud points in the initial point cloud data, in a corresponding space-filling curve are determined. The positions, corresponding to different point cloud points in the initial point cloud data, in the corresponding space-filling curve are sorted, and a filling order, matched with the filling mode, of different point cloud points in the initial point cloud data in the space grid structure is determined.

Figure 6:
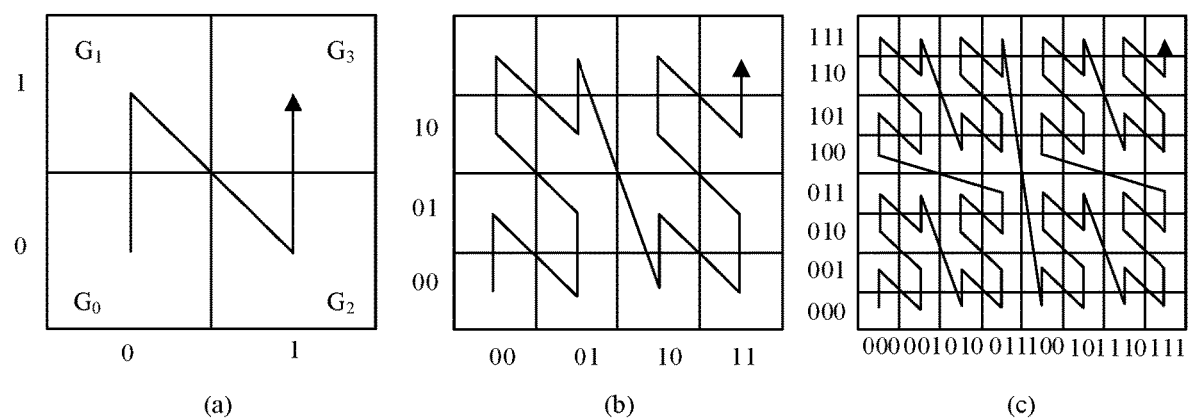
FIG. 6 is a schematic diagram of a space-filling curve for processing point cloud data according to an embodiment of the disclosure.
Figure 7:
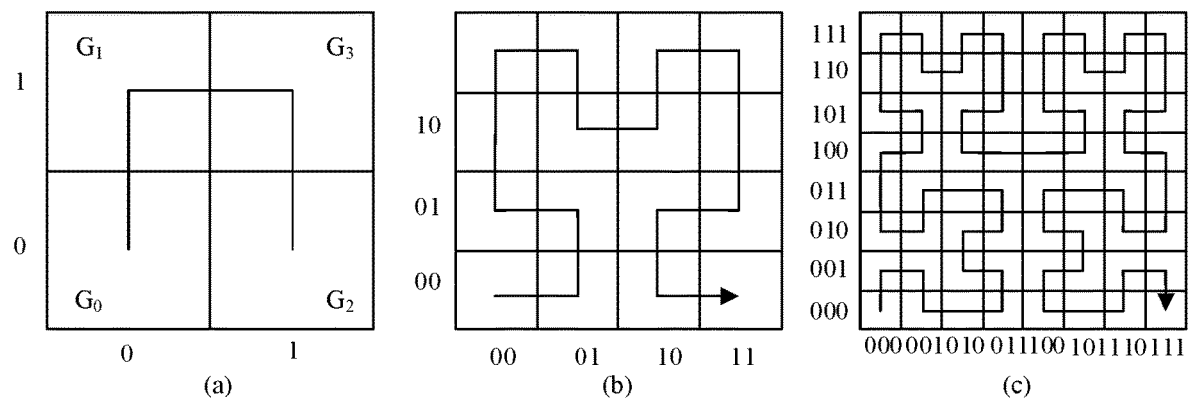
FIG. 7 is a schematic diagram of a space-filling curve for processing point cloud data according to an embodiment of the disclosure.

FIG. 6 is a schematic diagram of a space-filling curve for processing point cloud data according to an embodiment of the disclosure, and FIG. 7 is a schematic diagram of a space-filling curve for processing point cloud data according to an embodiment of the disclosure. A space-filling curve is a parameterized injection function, and is a continuous curve that maps unit intervals in a unit square, cube or more generally n-dimensional hypercube. With the increase of parameters, the space-filling curve may be arbitrarily close to a given point in a unit cube. In addition to the mathematical importance, the space-filling curve may also achieve effective dimensionality reduction of data. During construction of a curve, 3D coordinate information is represented by a 1D signal.

In the embodiments of the disclosure, a space-filling curve is a sorting method, and may carry corresponding sorting information of point cloud points, and may achieve effective dimensionality reduction of space. A corresponding curve passes through each discrete grid in space, and the grids are numbered in a linear order, to generate a corresponding index. Space-filling curves mainly include a Hilbert curve (corresponding to the Hilbert order), a Z curve (corresponding to the Morton order), etc.

Paths of a space-filling curve may only access discrete grids in space once, and do not cross each other. Each path has two end points, i.e. a starting point and an ending point, and the end points may be connected to end points of other paths to form a larger curve. A basic curve is referred to as a 1-order curve. In order to obtain an m-order curve, it is necessary to fill each grid of the basic curve with a (m−1)-order curve. Such filling requires the curve to undergo the necessary reflection and rotation to fit paths of a new curve.

2D space is taken as an example, and a 1-order basic Z curve is shown in FIG. 6(a). In order to obtain an m-order Z curve, grids of the basic Z curve are filled with a (m−1)-order Z curve. A 2-order Z curve is shown in FIG. 6(b), and a 3-order Z curve is shown in FIG. 6(c). It is unnecessary to reflect and rotate the Z curve during filling.

2D space is taken as an example, and a 1-order basic Hilbert curve is shown in FIG. 7(a). In order to obtain an m-order Hilbert curve, grids of the basic Hilbert curve are filled with a (m−1)-order Hilbert curve. A 2-order Hilbert curve is shown in FIG. 7(b), and a 3-order Hilbert curve is shown in FIG. 7(c). It is necessary to reflect and rotate the Hilbert curve in corresponding grids during filling.

Step 404. The point cloud data encoding apparatus determines, based on the filling order of different point cloud points in the initial point cloud data in the space grid structure, residual information matched with the initial point cloud data.

In the embodiments of the disclosure, the operation of determining, based on the filling order of different point cloud points in the initial point cloud data in the space grid structure, residual information matched with the initial point cloud data may be implemented by the following technical solutions: a first point cloud point and a second point cloud point in a space-filling curve are determined based a sorting result of positions, corresponding to different point cloud points in the initial point cloud data, in the corresponding space-filling curve. The first point cloud point and the second point cloud point are two adjacent point cloud points in the sorting result. The first point cloud point that precedes the second point cloud point is used as a reference point. Residual information matched with the initial point cloud data is determined based on a difference between the second point cloud point in the space-filling curve and the reference point.

For example, the first point cloud point in the space-filling curve is determined and used as a reference point based on the sorting result of the positions, corresponding to different point cloud points in the initial point cloud data, in the corresponding space-filling curve. Residual information matched with the initial point cloud data is determined based on a difference between the second point cloud point and the first point cloud point in the space-filling curve. The first point cloud point is denoted as $X_i$, the second point cloud point is denoted as $X_{i+1}$. The preceding point $X_i$ is used as a reference point, a residual corresponding to the succeeding point $X_{i+1}$ is $r_i=X_{i+1}-X_i$, and the obtained residual information may be encoded by using an entropy encoder.

In the embodiments of the disclosure, the operation of determining, based on the filling order of different point cloud points in the initial point cloud data in the space grid structure, residual information matched with the initial point cloud data may be implemented by the following technical solutions:

an encoding process matched with the point cloud data processing environment is triggered based on a sorting result of positions, corresponding to different point cloud points in the initial point cloud data, in a corresponding space-filling curve; and residual information matched with the initial point cloud data is determined based on the triggered encoding process. The triggered encoding process may be a prediction tree encoding process, or may be point cloud attribute encoding based on region-adaptive hierarchical transform (RAHT). RAHT merges three dimensions (x, y, z) of attribute values in blocks generated by an octree, and generates a set of high frequency coefficients and a set of low frequency coefficients each time until the root node is merged, and signals to be finally encoded and transmitted are all high frequency coefficients and a low frequency coefficient finally generated at the root node.

Step 405. The point cloud data encoding apparatus encodes the initial point cloud data according to the residual information to obtain target point cloud data.

Figure 8:
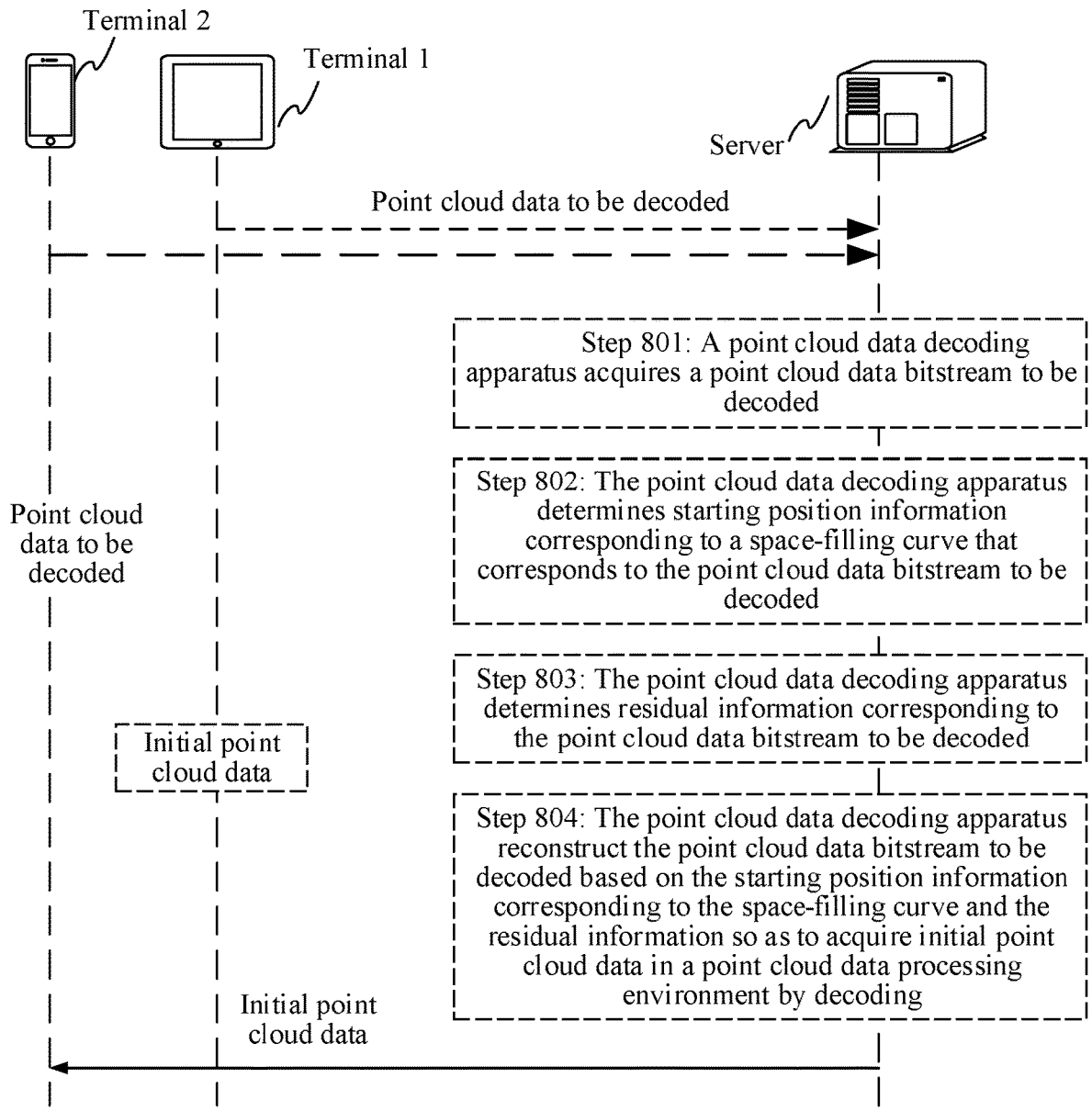
FIG. 8 is a schematic flowchart of a point cloud data decoding method according to an embodiment of the disclosure.

The point cloud data decoding method according to the embodiments of the disclosure will be described below with reference to the above embodiments. Referring to FIG. 8, which is a schematic flowchart of a point cloud data decoding method according to an embodiment of the disclosure, it is to be understood that steps shown in FIG. 8 may be implemented by various electronic devices on which a point cloud data decoding apparatus runs, such as a dedicated terminal with the point cloud data processing function and a mini program with the point cloud data processing function. The following describes the steps shown in FIG. 8.

Step 801. A point cloud data decoding apparatus acquires a point cloud data bitstream to be decoded. It is to be understood that the point cloud data bitstream to be decoded may be a point cloud data bitstream that is transmitted to and received by the point cloud data decoding apparatus after being encoded. A point cloud data bitstream carries a space-filling curve and related information such as residual information matched with initial point cloud data.

Step 802. The point cloud data decoding apparatus determines starting position information corresponding to a space-filling curve that corresponds to the point cloud data bitstream to be decoded.

For example, a space-filling curve is a sorting method, and may carry corresponding sorting information of point cloud points. The operation of determining starting position information corresponding to a space-filling curve that corresponds to the point cloud data bitstream to be decoded may be implemented by the following technical solutions: a space-filling curve is parsed to obtain corresponding starting position information; or header information of the point cloud data bitstream to be decoded is parsed to obtain starting position information corresponding to a space-filling curve; or at least one node in an octree structure is taken as starting position information corresponding to a space-filling curve in a case that initial point cloud data is divided based on the octree structure; or header information respectively corresponding to multiple different levels obtained by dividing initial point cloud data is parsed to obtain starting position information corresponding to a space-filling curve.

Step 803. The point cloud data decoding apparatus determines residual information corresponding to the point cloud data bitstream to be decoded.

Step 804. The point cloud data decoding apparatus reconstruct, based on the starting position information corresponding to the space-filling curve and the residual information, the point cloud data bitstream to be decoded so as to acquire initial point cloud data in a point cloud data processing environment by decoding.

In the embodiments of the disclosure, the operation of reconstructing, based on the starting position information corresponding to the space-filling curve and the residual information, the point cloud data bitstream to be decoded may be implemented by the following technical solutions: dimension information of the point cloud data bitstream to be decoded is determined; in response to the dimension information of the point cloud data bitstream to be decoded, the sum of a first point cloud point in a space-filling curve and corresponding residual information is determined based on starting position information corresponding to the space-filling curve in a case that a filling mode is processing with a single space-filling curve; and the point cloud data bitstream to be decoded is reconstructed based on the sum of the first point cloud point in the space-filling curve and the corresponding residual information. Specifically, a device of a decoding end obtains residual information $\{R|r_i \in R^n, i=1, \ldots N\}$; by parsing, and obtains a reconstructed signal $\{\hat{X}|\hat{x}_i \in R^n, i=1, \ldots N\}$; by decoding, where, n is a dimension of the signal.

In a case that only the space-filling curve method is adopted for sorting, based on a starting signal $\hat{X}_i$ for decoding, a reconstructed signal is the sum of the previous signal in a certain corresponding space-filling curve of the encoding end in the disclosure and a corresponding residual signal, i.e. $\{\hat{X}|\hat{x}_{i+1} = \hat{x}_i + r_i, i=1, \ldots N\}$. A prediction process matched with a point cloud data processing environment is determined in a case that a filling mode is processing with at least two types of space-filling curves; and the point cloud data bitstream to be decoded is reconstructed based on the determined prediction process.

The point cloud data processing method according to the embodiments of the disclosure will be described by taking point cloud data processing in an autonomous driving scenario as an example. A terminal runs a client process to trigger acquisition of point cloud data. The point cloud data is used for describing obstacles in the autonomous driving scenario, such as people, vehicles, and animals. The acquired point cloud data is stored in a server or a cloud server cluster by encoding to perform path planning based on obstacle avoidance.

Figure 9:
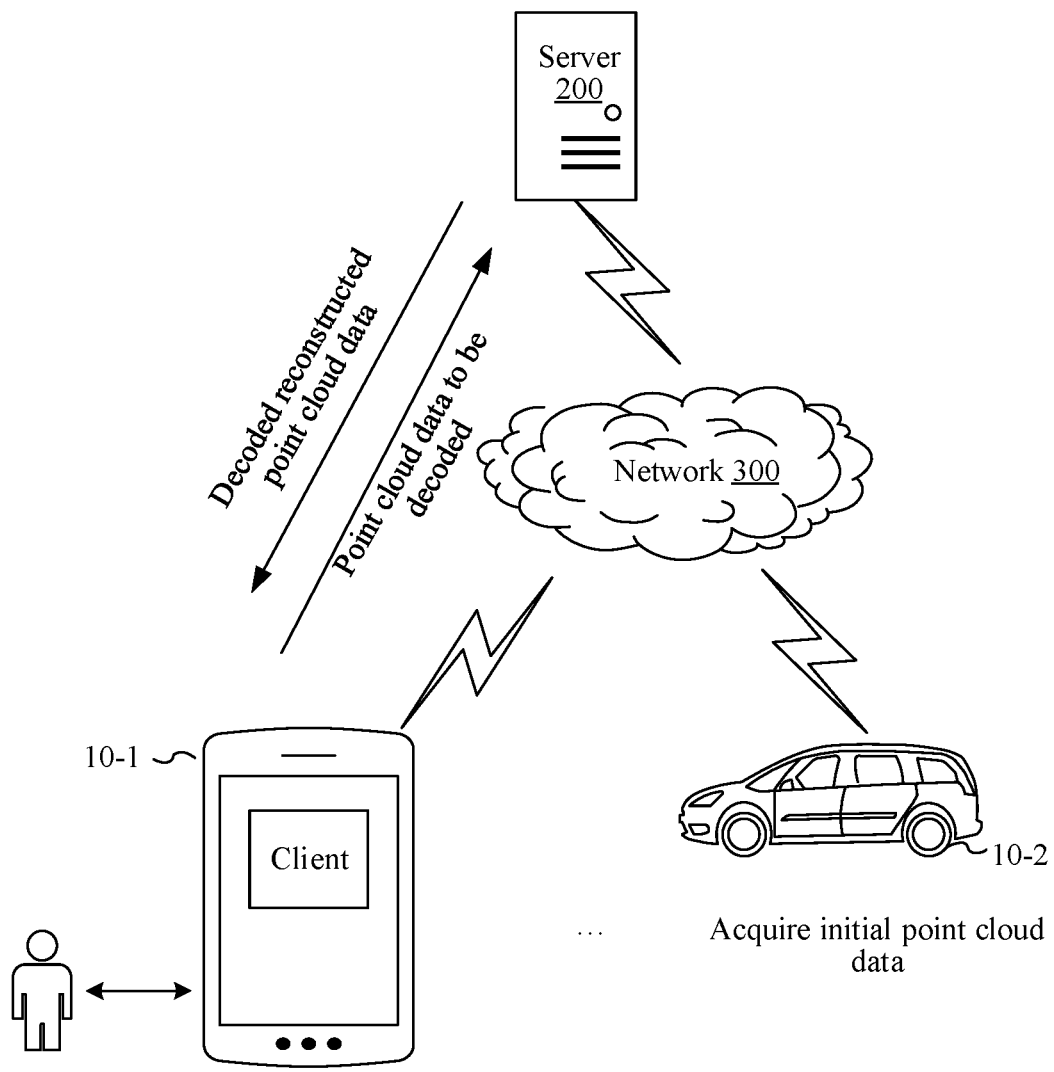
FIG. 9 is a schematic diagram of a usage scenario of a point cloud data processing method according to an embodiment of the disclosure.

Referring to FIG. 9, which is a schematic diagram of a usage scenario of a point cloud data processing method according to an embodiment of the disclosure, a corresponding client capable of performing the obstacle recognition function is arranged on the terminals (including the terminal 10-1 and the vehicle terminal 10-2), the terminals (including the terminal 10-1 and the terminal 10-2) perform point cloud data transmission with the corresponding server 200 through the network 300, so as to realize obstacle recognition during autonomous driving. The terminal runs a client process to trigger acquisition of point cloud data, the acquired point cloud data is stored in a server or a cloud server cluster by encoding for the vehicle terminal 10-2 to use or train. The terminals are connected to the server 200 through the network 300, the network 300 may be a wide area network or a local area network, or a combination thereof, and uses wireless links to transmit data. The terminals (including the terminal 10-1 and the vehicle terminal 10-2) may also acquire a point cloud data bitstream from the corresponding server 200 through the network 300 and perform decoding.

Point cloud data is used for describing various objects or obstacles. For example, obstacles in an autonomous driving scenario may be people, vehicles, animals, etc.

Figure 10:
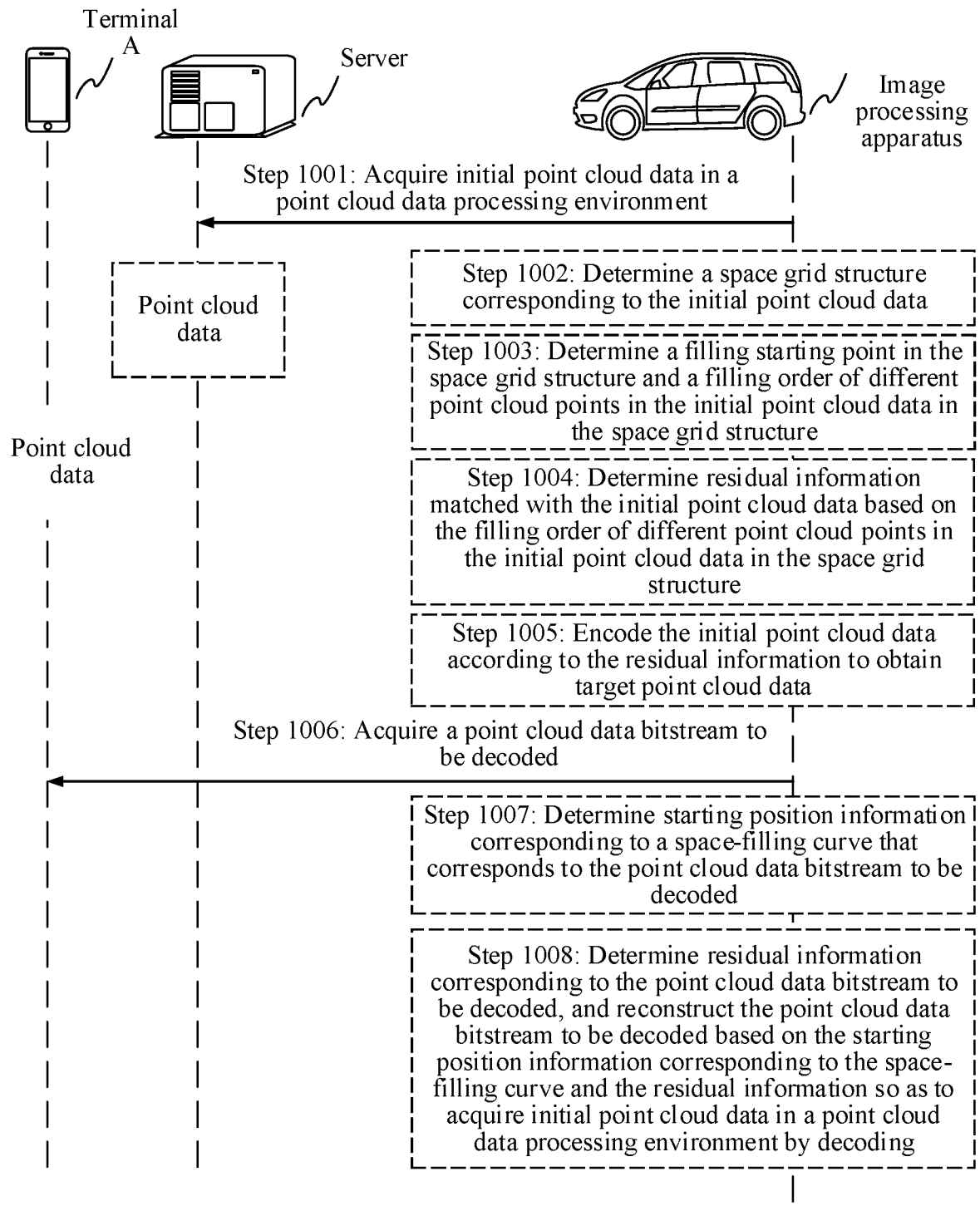
FIG. 10 is a schematic flowchart of a point cloud data processing method according to an embodiment of the disclosure.
Figure 11:
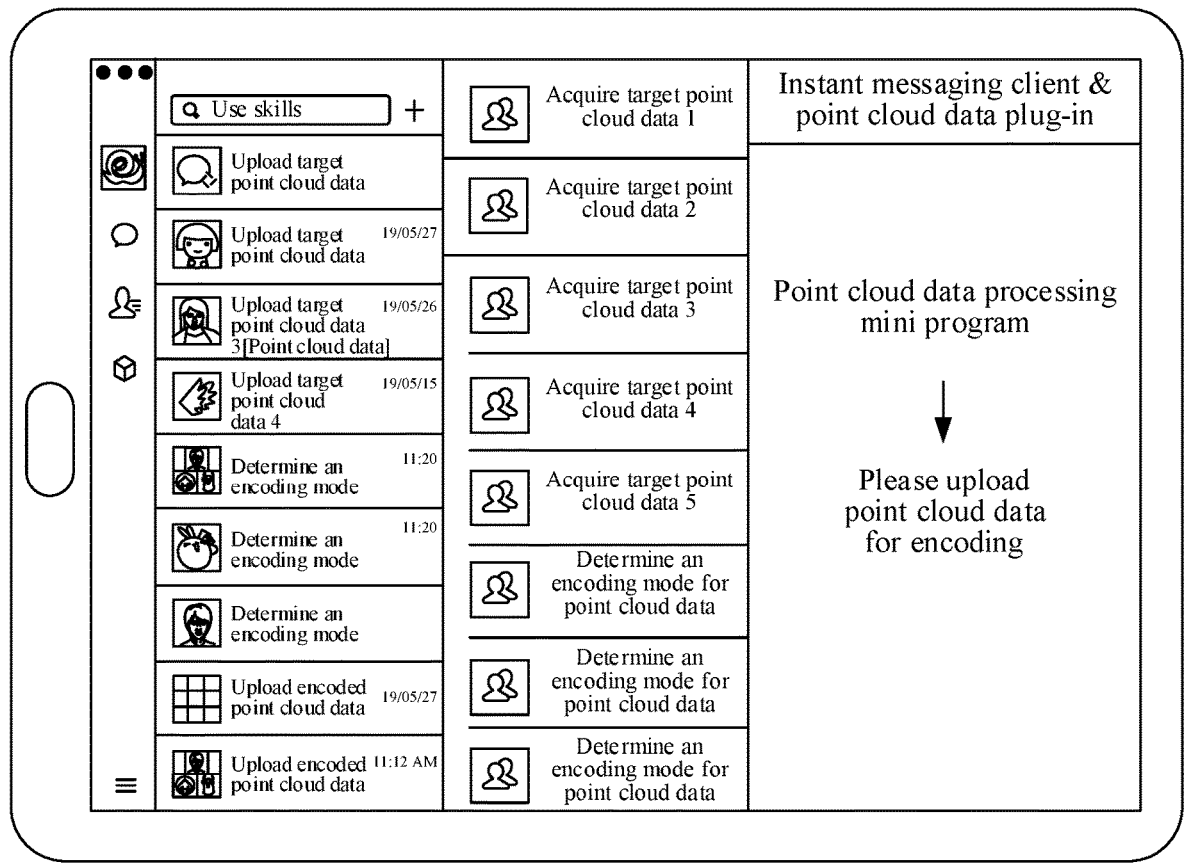
FIG. 11 is a schematic diagram of a display effect of a point cloud data processing method according to an embodiment of the disclosure.

Referring to FIG. 10, FIG. 10 is a schematic flowchart of a point cloud data processing method according to an embodiment of the disclosure. FIG. 11 is a schematic diagram of a display effect of a point cloud data processing method according to an embodiment of the disclosure. In an autonomous driving scenario, a point cloud data processing process of a point cloud data processing device that may be triggered by a mini program in a client process includes the following steps:

Step 1001. Acquire initial point cloud data in a point cloud data processing environment.

Step 1002. Determine a space grid structure corresponding to the initial point
cloud data.

Step 1003. Determine a filling starting point in the space grid structure and a filling order of different point cloud points in the initial point cloud data in the space grid structure.

Step 1004. Determine residual information matched with the initial point cloud data based on the filling order of different point cloud points in the initial point cloud data in the space grid structure.

Step 1005. Encode the initial point cloud data based on the residual information to obtain target point cloud data.

Step 1006. Acquire a point cloud data bitstream to be decoded.

Step 1007. Determine starting position information corresponding to a space-filling curve that corresponds to the point cloud data bitstream to be decoded.

Step 1008. Determine residual information corresponding to the point cloud data bitstream to be decoded, and reconstruct, based on the starting position information corresponding to the space-filling curve and the residual information, the point cloud data bitstream to be decoded so as to acquire initial point cloud data in a point cloud data processing environment by decoding.

An exemplary structure of the point cloud data encoding apparatus 2020-1 according to the embodiments of the disclosure that is implemented as software modules will be described below. In some embodiments, as shown in FIG. 2, soft modules in the point cloud data encoding apparatus 2020-1 stored in the memory 202 may include: a first information transmission module 2081, configured to acquire initial point cloud data in a point cloud data processing environment; and an encoding module 2082, configured to determine a space grid structure corresponding to the initial point cloud data; determine a filling order of different point cloud points in the initial point cloud data in the space grid structure; determine residual information matched with the initial point cloud data based on the filling order of different point cloud points in the initial point cloud data in the space grid structure; and encode the initial point cloud data based on the residual information to obtain target point cloud data.

In some embodiments, the encoding module 2082 is further configured to: determine side length parameters of division child nodes or number parameters of the division child nodes in a case that an equal division mode is adopted; and divide bounding box space corresponding to the initial point cloud data based on the side length parameters of the division child nodes or the number parameters of the division child nodes to obtain a space grid structure corresponding to the initial point cloud data.

In some embodiments, the encoding module 2082 is further configured to: determine depth parameters of an octree structure or the number of affiliate nodes of child nodes in the octree structure in a case that the initial point cloud data is divided based on the octree structure; and divide bounding box space corresponding to the initial point cloud data based on the depth parameters of the octree structure or the number of the affiliate nodes of the child nodes in the octree structure to obtain a space grid structure corresponding to the initial point cloud data.

In some embodiments, the encoding module 2082 is further configured to: determine an adaptive standard matched with the point cloud data processing environment in a case that the initial point cloud data is divided based on the adaptive standard; and divide bounding box space corresponding to the initial point cloud data based on the adaptive standard matched with the point cloud data processing environment to obtain a space grid structure corresponding to the initial point cloud data.

In some embodiments, the encoding module 2082 is further configured to: determine the order of a space-filling curve according to the number of division child nodes; determine a filling mode corresponding to the order according to the order of the space-filling curve; and determine a filling order matched with the filling mode.

In some embodiments, the encoding module 2082 is further configured to: determine positions, corresponding to different point cloud points in the initial point cloud data, in a single space-filling curve in a case that the filling mode is processing with the single space-filling curve; and connect the positions, corresponding to different point cloud points in the initial point cloud data, in the single space-filling curve in series, and determine a filling order, matched with the filling mode, of different point cloud points in the initial point cloud data in the space grid structure.

In some embodiments, the encoding module 2082 is further configured to: respectively process corresponding division child nodes with at least two types of space-filling curves in a case that the filling mode is processing with the at least two types of space-filling curves, and determine positions, corresponding to different point cloud points in the initial point cloud data, in a corresponding space-filling curve; and sort the positions, corresponding to different point cloud points in the initial point cloud data, in the corresponding space-filling curve, and determine a filling order, matched with the filling mode, of different point cloud points in the initial point cloud data in the space grid structure.

In some embodiments, the encoding module 2082 is further configured to: determine a filling starting point in the space grid structure based on the origin of a space coordinate system corresponding to the space grid structure, or determine a filling starting point in the space grid structure based on a coordinate point corresponding to the lower left corner coordinate of a starting bounding box corresponding to the initial point cloud data. The filling starting point is the first filling point corresponding to the filling order.

In some embodiments, the encoding module 2082 is further configured to: determine a first point cloud point and a second point cloud point in a space-filling curve based on a sorting result of positions, corresponding to different point cloud points in the initial point cloud data, in the corresponding space-filling curve; the first point cloud point and the second point cloud point being two adjacent point cloud points in the sorting result; take the first point cloud point preceding the second point cloud point as a reference point; and determine residual information matched with the initial point cloud data based on a difference between the second point cloud point in the space-filling curve and the reference point.

In some embodiments, the encoding module 2082 is further configured to: trigger an encoding process matched with the point cloud data processing environment based on a sorting result of positions, corresponding to different point cloud points in the initial point cloud data, in a corresponding space-filling curve; and determine residual information matched with the initial point cloud data based on the triggered encoding process.

An exemplary structure of the point cloud data decoding apparatus 2020-2 according to the embodiments of the disclosure that is implemented as software modules will be described below. In some embodiments, as shown in FIG. 2, soft modules in the point cloud data decoding apparatus 2020-2 stored in the memory 202 may include: a second information transmission module 2083, configured to acquire a point cloud data bitstream to be decoded; and a decoding module 2084, configured to determine starting position information corresponding to a space-filling curve that corresponds to the point cloud data bitstream to be decoded; determine residual information corresponding to the point cloud data bitstream to be decoded; and reconstruct the point cloud data bitstream to be decoded based on the starting position information corresponding to the space-filling curve and the residual information.

In some embodiments, the decoding module 2084 is further configured to parse a space-filling curve to obtain corresponding starting position information; or parse header information of the point cloud data bitstream to be decoded to obtain starting position information corresponding to a space-filling curve; or take at least one node in an octree structure as starting position information corresponding to a space-filling curve in a case that initial point cloud data is divided based on the octree structure; or parse header information respectively corresponding to multiple different levels obtained by dividing initial point cloud data to obtain starting position information corresponding to a space-filling curve.

In some embodiments, the decoding module 2084 is further configured to determine the sum of a first point cloud point in a space-filling curve and corresponding residual information based on starting position information corresponding to the space-filling curve in a case that a filling mode is processing with a single space-filling curve; and reconstruct the point cloud data bitstream to be decoded based on the sum of the first point cloud point in the space-filling curve and the corresponding residual information.

In some embodiments, the decoding module 2084 is further configured to determine a prediction process matched with a point cloud data processing environment in a case that a filling mode is processing with at least two types space-filling curves; and reconstruct the point cloud data bitstream to be decoded based on the determined prediction process.

An exemplary structure of the point cloud data processing apparatus 2020-3 according to the embodiments of the disclosure that is implemented as software modules will be described below. In some embodiments, as shown in FIG. 2, soft modules in the point cloud data processing apparatus 2020-3 stored in the memory 202 may include: a first information transmission module 2081, configured to acquire initial point cloud data in a point cloud data processing environment; an encoding module 2082, configured to determine a space grid structure corresponding to the initial point cloud data; determine a filling order of different point cloud points in the initial point cloud data in the space grid structure; determine residual information matched with the initial point cloud data based on the filling order of different point cloud points in the initial point cloud data in the space grid structure; and encode the initial point cloud data according to the residual information to obtain target point cloud data; a second information transmission module 2083, configured to acquire a point cloud data bitstream to be decoded; and a decoding module 2084, configured to determine starting position information corresponding to a space-filling curve that corresponds to the point cloud data bitstream to be decoded; determine residual information corresponding to the point cloud data bitstream to be decoded; and reconstruct the point cloud data bitstream to be decoded based on the starting position information corresponding to the space-filling curve and the residual information.

The embodiments of the disclosure have the following beneficial effects:

According to the embodiments of the disclosure, initial point cloud data in a point cloud data processing environment is acquired; a space grid structure corresponding to the initial point cloud data is determined; a filling starting point in the space grid structure and a filling order of different point cloud points in the initial point cloud data in the space grid structure are determined; residual information matched with the initial point cloud data is determined based on the filling order of different point cloud points in the initial point cloud data in the space grid structure; and the initial point cloud data is encoded according to the residual information to obtain target point cloud data. Therefore, the initial point cloud data may be encoded based on a sorting result of the filling order of different point cloud points in the initial point cloud data in the space grid structure to obtain the target point cloud data, which reduces the complexity of point cloud data encoding, reduces the waiting time of point cloud data encoding, saves the calculation amount of point cloud data encoding, improves efficiency of point cloud data encoding, and improves the user experience.

The foregoing are merely embodiments of the disclosure, but are not intended to limit the protection scope of the disclosure. Any modification, equivalent replacement, and improvement made without departing from the spirit and principle of the disclosure shall fall within the protection scope of the disclosure.

What is claimed is:

1. A point cloud data encoding method, performed by an electronic device, the method comprising:
   acquiring initial point cloud data in a point cloud data processing environment;
   determining a space grid structure corresponding to the initial point cloud data;
   determining a filling order of different point cloud points in the initial point cloud data in the space grid structure;
   determining, based on the filling order, residual information matched with the initial point cloud data; and
   encoding, according to the residual information, the initial point cloud data to obtain target point cloud data,
   wherein the determining the filling order comprises;
      determining an order of a space-filling curve based on a number of division child nodes;
      determining a filling mode based on the order of the space-filling curve; and
      determining a first filling order matched with the filling mode, wherein the order of the space-filling curve is m-order, wherein m is an integer greater than or equal to 1, wherein the determining the first filling order comprises:
respectively processing corresponding division child nodes with at least two types of space-filling curves, based on the filling mode being processing with the at least two types of space-filling curves, and determining positions, corresponding to the different point cloud points, in a corresponding space-filling curve; and
sorting the positions, corresponding to the different point cloud points, in the corresponding space-filling curve, and determining a second filling order, matched with the filling mode, of the different point cloud points, wherein the method further comprises, prior to the determining the filling order:
determining a filling starting point in the space grid structure based on an origin of a space coordinate system corresponding to the space grid structure, or
determining the filling starting point based on a coordinate point corresponding to a lower left corner coordinate of a starting bounding box corresponding to the initial point cloud data, and
wherein the filling starting point is a first filling point corresponding to the filling order.

2. The method according to claim 1, wherein the determining the space grid structure comprises:
determining side length parameters of division child nodes or number parameters of the division child nodes, based on an equal division mode being adopted; and
dividing, based on the side length parameters of the division child nodes or the number parameters of the division child nodes, bounding box space corresponding to the initial point cloud data to obtain the space grid structure corresponding to the initial point cloud data.

3. The method according to claim 1, wherein the determining the space grid structure comprises:
determining depth parameters of an octree structure or a number of affiliate nodes of child nodes in the octree structure, based on the initial point cloud data being divided based on the octree structure; and
dividing, based on the depth parameters or the number of affiliate nodes, bounding box space corresponding to the initial point cloud data to obtain the space grid structure corresponding to the initial point cloud data.

4. The method according to claim 1, wherein the determining the space grid structure comprises:
determining an adaptive standard matched with the point cloud data processing environment based on the initial point cloud data being divided based on the adaptive standard; and
dividing, based on the adaptive standard matched with the point cloud data processing environment, bounding box space corresponding to the initial point cloud data to obtain the space grid structure corresponding to the initial point cloud data.

5. The method according to claim 1, wherein the determining the residual information comprises:
determining that a first point cloud point in the space-filling curve is used as a reference point, based on a sorting result of positions, corresponding to the different point cloud points, in a corresponding space-filling curve; and
determining the residual information matched with the initial point cloud data, based on a difference between a second point cloud point and the first point cloud point in the space-filling curve.

6. The method according to claim 5, wherein the first point cloud point and the second point cloud point are two adjacent point cloud points in a result of sorting positions, corresponding to the different point cloud points, in a second corresponding space-filling curve, and the first point cloud point precedes the second point cloud point.

7. The method according to claim 1, wherein the determining the residual information comprises:
triggering an encoding process matched with the point cloud data processing environment based on a sorting result of positions, corresponding to the different point cloud points, in a first corresponding space-filling curve; and
determining the residual information matched with the initial point cloud data based on the triggered encoding process.

8. A point cloud data decoding method, performed by an electronic device, the method comprising:
acquiring a point cloud data bitstream to be decoded;
determining starting position information corresponding to a space-filling curve that corresponds to the point cloud data bitstream to be decoded;
determining residual information corresponding to the point cloud data bitstream to be decoded; and
reconstructing the point cloud data bitstream to be decoded based on the starting position information corresponding to the space-filling curve and the residual information,
wherein an order of the space-filling curve is m-order, wherein m is an integer greater than or equal to 1,
wherein the reconstructing the point cloud data bitstream comprises:
determining a prediction process matched with a point cloud data processing environment, based on a filling mode being processing with at least two types of space-filling curves; and
reconstructing the point cloud data bitstream to be decoded based on the determined prediction process, and
wherein the starting position information is based on:
an origin of a space coordinate system corresponding to a space grid structure corresponding to the point cloud data bitstream, or
a coordinate point corresponding to a lower left corner coordinate of a starting bounding box corresponding to the point cloud data bitstream.

9. The method according to claim 8, wherein the determining the starting position information comprises:
parsing the space-filling curve to obtain corresponding starting position information; or
parsing header information of the point cloud data bitstream to be decoded to obtain starting position information corresponding to the space-filling curve; or
taking at least one node in an octree structure as starting position information corresponding to the space-filling curve, based on initial point cloud data being divided based on the octree structure; or
parsing header information respectively corresponding to multiple different levels obtained by dividing initial point cloud data to obtain starting position information corresponding to the space-filling curve.

10. A point cloud data processing method, performed by an electronic device, the method comprising:

acquiring initial point cloud data in a point cloud data processing environment;
determining a space grid structure corresponding to the initial point cloud data;
determining a filling order of different point cloud points in the initial point cloud data in the space grid structure;
determining, based on the filling order of the different point cloud points, residual information matched with the initial point cloud data;
encoding, according to the residual information, the initial point cloud data to obtain target point cloud data,
wherein the determining the filling order comprises:
  determining an order of a first space-filling curve based on a number of division child nodes;
  determining a filling mode based on the order of the first space-filling curve; and
  determining a first filling order matched with the filling mode,
wherein the order of the first space-filling curve is m-order, wherein m is an integer greater than or equal to 1,
wherein the determining the first filling order comprises:
  respectively processing corresponding division child nodes with at least two types of space-filling curves, based on the filling mode being processing with the at least two types of space-filling curves, and determining positions, corresponding to the different point cloud points, in a corresponding space-filling curve; and
  sorting the positions, corresponding to the different point cloud points, in the corresponding space-filling curve, and determining a second filling order, matched with the filling mode, of the different point cloud points,
wherein the method further comprises, prior to the determining the filling order:
  determining a filling starting point in the space grid structure based on an origin of a space coordinate system corresponding to the space grid structure, or
  determining the filling starting point based on a coordinate point corresponding to a lower left corner coordinate of a starting bounding box corresponding to the initial point cloud data,
wherein the filling starting point is a first filling point corresponding to the filling order, and
wherein the method further comprises:
  acquiring a point cloud data bitstream to be decoded;
  determining starting position information corresponding to a second space-filling curve that corresponds to the point cloud data bitstream to be decoded;
  determining residual information corresponding to the point cloud data bitstream to be decoded; and
  reconstructing, based on the starting position information corresponding to the second space-filling curve and the residual information, the point cloud data bitstream to be decoded, to acquire the initial point cloud data by decoding.

11. An electronic device, comprising:
a memory, configured to store executable instructions; and
a processor, configured to read the executable instructions and operate as instructed by the executable instructions, the executable instructions comprising:
acquiring code configured to cause the processor to acquire initial point cloud data in a point cloud data processing environment;
first determining code configured to cause the processor to determine a space grid structure corresponding to the initial point cloud data;
second determining code configured to cause the processor to determine a filling order of different point cloud points in the initial point cloud data in the space grid structure;
third determining code configured to cause the processor to determine, based on the filling order, residual information matched with the initial point cloud data; and
encoding code configured to cause the processor to encode, according to the residual information, the initial point cloud data to obtain target point cloud data,
wherein the second determining code further comprises fourth determining code, fifth determining code, and sixth determining code,
wherein the fourth determining code is configured to cause the processor to determine an order of a space-filling curve based on a number of division child nodes,
wherein the fifth determining code is configured to cause the processor to determine a filling mode based on the order of the space-filling curve,
wherein the sixth determining code is configured to cause the processor to determine a first filling order matched with the filling mode,
wherein the order of the space-filling curve is m-order, wherein m is an integer greater than or equal to 1,
wherein the fifth determining code is configured to cause the processor to:
  respectively process corresponding division child nodes with at least two types of space-filling curves, based on the filling mode being processing with the at least two types of space-filling curves, and determine positions, corresponding to the different point cloud points, in a corresponding space-filling curve; and
  sort the positions, corresponding to the different point cloud points, in the corresponding space-filling curve, and determine a second filling order, matched with the filling mode, of the different point cloud points,
wherein the executable instructions further comprise:
  seventh determining code configured to cause the processor to determine a filling starting point in the space grid structure based on an origin of a space coordinate system corresponding to the space grid structure, or
  eighth determining code configured to cause the processor to determine the filling starting point based on a coordinate point corresponding to a lower left corner coordinate of a starting bounding box corresponding to the initial point cloud data, and
wherein the filling starting point is a first filling point corresponding to the filling order.

12. An electronic device, comprising:
a memory, configured to store executable instructions; and
a processor, configured to read the executable instructions and operate as instructed by the executable instructions, the executable instructions comprising:
acquiring code configured to cause the processor to acquire a point cloud data bitstream to be decoded;
first determining code configured to cause the processor to determine starting position information corresponding to a space-filling curve that corresponds to the point cloud data bitstream to be decoded;

second determining code configured to cause the processor to determine residual information corresponding to the point cloud data bitstream to be decoded; and reconstructing code configured to cause the processor to reconstruct the point cloud data bitstream to be decoded based on the starting position information corresponding to the space-filling curve and the residual information, wherein an order of the space-filling curve is m-order, wherein m is an integer greater than or equal to 1, wherein the reconstructing code is configured to cause the processor to:

determine a prediction process matched with a point cloud data processing environment, based on a filling mode being processing with at least two types of space-filling curves; and reconstruct the point cloud data bitstream to be decoded based on the determined prediction process, and wherein the starting position information is based on;

an origin of a space coordinate system corresponding to a space grid structure corresponding to the point cloud data bitstream, or a coordinate point corresponding to a lower left corner coordinate of a starting bounding box corresponding to the point cloud data bitstream.

13. A non-transitory computer-readable storage medium, storing executable instructions, the executable instructions, when executed by a processor, causes the processor to at least:

acquire initial point cloud data in a point cloud data processing environment;

determine a space grid structure corresponding to the initial point cloud data;

determine a filling order of different point cloud points in the initial point cloud data in the space grid structure;

determine, based on the filling order, residual information matched with the initial point cloud data; and encode, according to the residual information, the initial point cloud data to obtain target point cloud data, wherein the determining the filling order comprises;

determining an order of a space-filling curve based on a number of division child nodes;

determining a filling mode based on the order of the space-filling curve; and determining a first filling order matched with the filling mode, wherein the order of the space-filling curve is m-order, wherein m is an integer greater than or equal to 1, wherein the determining the first filling order comprises:

respectively processing corresponding division child nodes with at least two types of space-filling curves, based on the filling mode being processing with the at least two types of space-filling curves, and determining positions, corresponding to the different point cloud points, in a corresponding space-filling curve; and sorting the positions, corresponding to the different point cloud points, in the corresponding space-filling curve, and determining a second filling order, matched with the filling mode, of the different point cloud points, wherein the method further comprises, prior to the determining the filling order:

determining a filling starting point in the space grid structure based on an origin of a space coordinate system corresponding to the space grid structure, or determining the filling starting point based on a coordinate point corresponding to a lower left corner coordinate of a starting bounding box corresponding to the initial point cloud data, and wherein the filling starting point is a first filling point corresponding to the filling order.

14. A non-transitory computer-readable storage medium, storing executable instructions, the executable instructions, when executed by a processor, causes the processor to at least:

acquire a point cloud data bitstream to be decoded;

determine starting position information corresponding to a space-filling curve that corresponds to the point cloud data bitstream to be decoded;

determine residual information corresponding to the point cloud data bitstream to be decoded; and reconstruct the point cloud data bitstream to be decoded based on the starting position information corresponding to the space-filling curve and the residual information, wherein the reconstructing the point cloud data bitstream comprises;

determining a prediction process matched with a point cloud data processing environment, based on a filling mode being processing with at least two types of space-filling curves; and reconstructing the point cloud data bitstream to be decoded based on the determined prediction process, and wherein the starting position information is based on:

an origin of a space coordinate system corresponding to a space grid structure corresponding to the point cloud data bitstream, or a coordinate point corresponding to a lower left corner coordinate of a starting bounding box corresponding to the point cloud data bitstream.

* * * * *